United States Patent
Shiraishi et al.

(10) Patent No.: US 12,424,911 B2
(45) Date of Patent: Sep. 23, 2025

(54) MOTOR-DRIVEN COMPRESSOR WITH NOISE REDUCTION UNIT

(71) Applicant: KABUSHIKI KAISHA TOYOTA JIDOSHOKKI, Kariya (JP)

(72) Inventors: Kazuhiro Shiraishi, Kariya (JP); Keiji Yashiro, Kariya (JP); Shinji Kawahara, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 34 days.

(21) Appl. No.: 18/605,329

(22) Filed: Mar. 14, 2024

(65) Prior Publication Data
US 2024/0333109 A1    Oct. 3, 2024

(30) Foreign Application Priority Data

Mar. 27, 2023   (JP) ................. 2023-050107

(51) Int. Cl.
| | |
|---|---|
| *H02K 11/33* | (2016.01) |
| *F04C 18/02* | (2006.01) |
| *F25B 31/02* | (2006.01) |
| *H01F 27/24* | (2006.01) |
| *H01F 27/26* | (2006.01) |

(Continued)

(52) U.S. Cl.
CPC .......... *H02K 11/33* (2016.01); *F04C 18/0215* (2013.01); *F25B 31/026* (2013.01); *H01F 27/24* (2013.01); *H01F 27/266* (2013.01); *H01F 27/30* (2013.01); *H01F 27/306* (2013.01); *H01F 27/324* (2013.01); *H01F 27/33* (2013.01); *H01F 37/00* (2013.01); *H02K 7/14* (2013.01); *H02K 11/30* (2016.01); *H02M 1/123* (2021.05); *H02M 1/126* (2013.01); *F04C 2240/40* (2013.01)

(58) Field of Classification Search
CPC ................. H01F 27/26–266; H01F 27/30–306
See application file for complete search history.

(56) References Cited

U.S. PATENT DOCUMENTS

| | | |
|---|---|---|
| 2002/0190382 A1 | 12/2002 | Kouno et al. |
| 2003/0071263 A1 | 4/2003 | Kouno et al. |

(Continued)

FOREIGN PATENT DOCUMENTS

| | | |
|---|---|---|
| JP | 2002-373896 A | 12/2002 |
| JP | 2009-218294 A | 9/2009 |

(Continued)

*Primary Examiner* — Laert Dounis
(74) *Attorney, Agent, or Firm* — Sughrue Mion, PLLC

(57) ABSTRACT

A motor-driven compressor includes a housing that accommodates an inverter device. A noise reduction unit of the inverter device includes a common mode choke coil including a looped core and two windings wound around the core, and a looped conductor surrounding the two windings. The conductor is configured so that an induced current flows in the conductor in a circumferential direction of the conductor to resist changes in a leakage magnetic flux from the core. The conductor includes a housing-side conductor portion located between the two windings and the housing. The housing-side conductor portion includes a through-hole that extends through the housing-side conductor portion in the axial direction of the core. The housing includes a projection that is inserted into the through-hole and opposed to the two windings.

6 Claims, 7 Drawing Sheets

(51) Int. Cl.
    *H01F 27/30*     (2006.01)
    *H01F 27/32*     (2006.01)
    *H01F 27/33*     (2006.01)
    *H01F 37/00*     (2006.01)
    *H02K 7/14*     (2006.01)
    *H02K 11/30*     (2016.01)
    *H02M 1/12*     (2006.01)

(56) References Cited

U.S. PATENT DOCUMENTS

| | | |
|---|---|---|
| 2016/0307684 A1 | 10/2016 | Takiguchi et al. |
| 2017/0012506 A1* | 1/2017 | Naito ................... H02K 11/33 |
| 2019/0089243 A1* | 3/2019 | Naito ................... H02M 1/126 |
| 2019/0305648 A1 | 10/2019 | Ambo et al. |
| 2020/0298654 A1* | 9/2020 | Kagawa ............. B60H 1/00642 |
| 2020/0312532 A1 | 10/2020 | Fukasaku et al. |
| 2020/0321836 A1* | 10/2020 | Kagawa ................ H02K 11/01 |
| 2021/0320566 A1* | 10/2021 | Yamamoto ............... H02K 5/06 |
| 2024/0145152 A1* | 5/2024 | Ito .......................... H01F 37/00 |

FOREIGN PATENT DOCUMENTS

| | | | |
|---|---|---|---|
| JP | 2010-171209 A | | 8/2010 |
| JP | 2015-141918 A | | 8/2015 |
| JP | 2018-022736 A | | 2/2018 |
| JP | 2019-187228 A | | 10/2019 |
| JP | 2020-004823 A | | 1/2020 |
| JP | 2020-165395 A | | 10/2020 |
| JP | 2021168562 A | * | 10/2021 |

\* cited by examiner

MOTOR-DRIVEN COMPRESSOR WITH NOISE REDUCTION UNIT

BACKGROUND

1. Field

The present disclosure relates to a motor-driven compressor.

2. Description of Related Art

Japanese Laid-Open Patent Publication No. 2019-187228 discloses a motor-driven compressor including a compression unit that compresses fluid, a motor that drives the compression unit, an inverter device that drives the motor, and a housing that accommodates the inverter device. The inverter device includes an inverter circuit and a noise reduction unit. The inverter circuit converts direct-current power into alternating-current power. The noise reduction unit is arranged at the input side of the inverter circuit. The noise reduction unit reduces common mode noise and normal mode noise included in the direct-current power input to the inverter circuit. The noise reduction unit includes a common mode choke coil and a looped conductor. The common mode choke coil includes a looped core and two windings wound around the core. The conductor surrounds the two windings. When a normal mode current flows through the two windings, a leakage magnetic flux is generated from the core. An induced current flows in the conductor in the circumferential direction of the conductor to resist changes in the leakage magnetic flux from the core.

When current flows through the two windings, the two windings generate heat. The heat of the two windings is dissipated to the housing. When the two windings are surrounded by the conductor as in the above publication, the conductor is partly arranged between the windings and the housing. Thus, the distance from the windings to the housing is increased by the thickness of the conductor. This lowers the heat dissipation performance of the windings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor includes a compression unit configured to compress fluid, a motor configured to drive the compression unit, an inverter device configured to drive the motor, and a housing that accommodates the inverter device. The inverter device includes an inverter circuit that converts direct-current power into alternating-current power, and a noise reduction unit arranged at an input side of the inverter circuit and configured to reduce common mode noise and normal mode noise included in the direct-current power input to the inverter circuit. The noise reduction unit includes a common mode choke coil including a looped core and two windings wound around the core, and a looped conductor surrounding the two windings. The conductor is configured so that an induced current flows in the conductor in a circumferential direction of the conductor to resist changes in a leakage magnetic flux from the core. The conductor includes a housing-side conductor portion located between the two windings and the housing. The housing-side conductor portion includes a through-hole that extends through the housing-side conductor portion in the axial direction of the core. The housing includes a projection that is inserted into the through-hole and opposed to the two windings.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor according to one embodiment will now be described with reference to FIGS. 1 to 7. The motor-driven compressor of the present embodiment is used for a vehicle air conditioner.

Vehicle Air Conditioner

Figure 1:
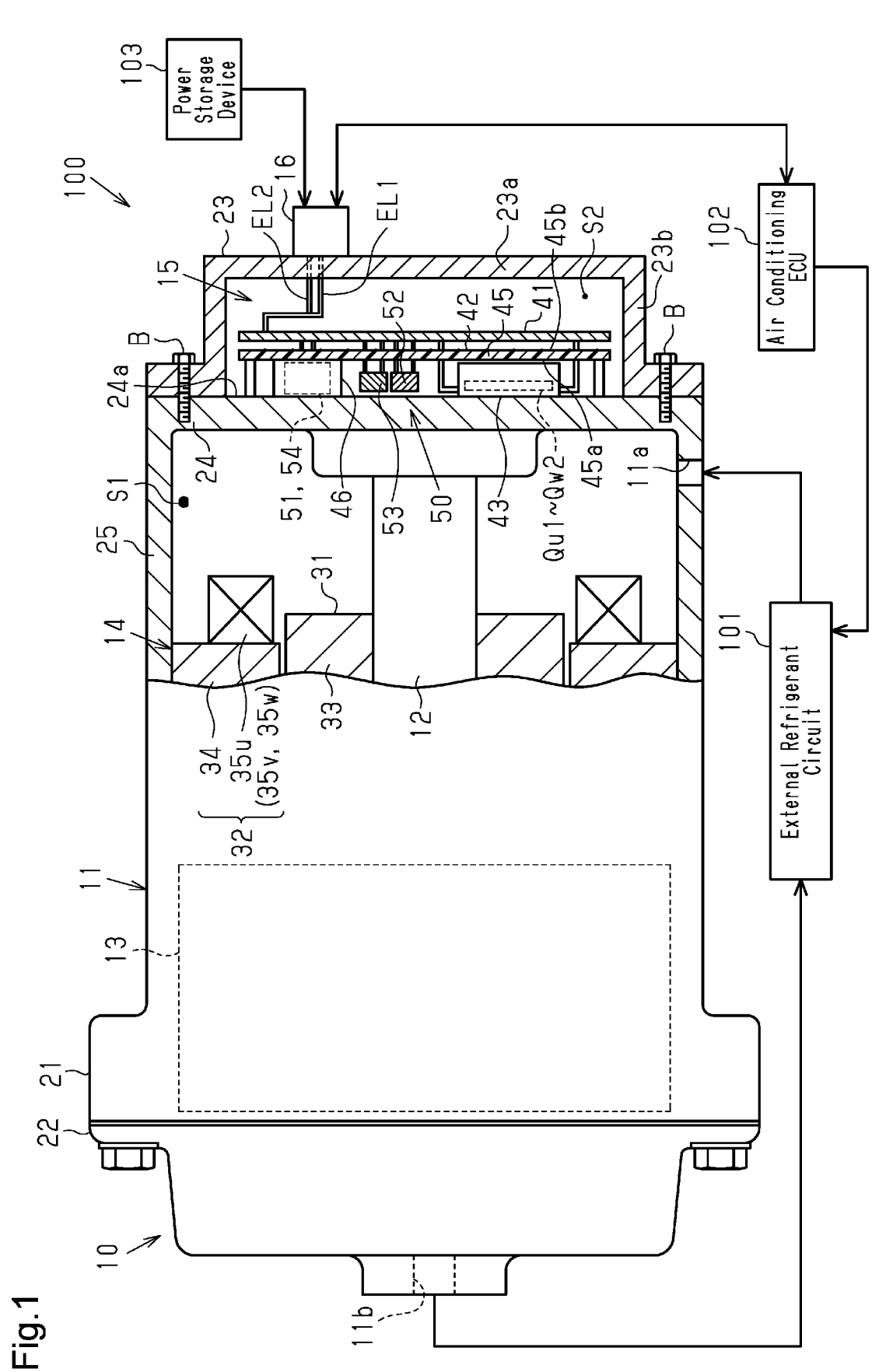
FIG. 1 is a cross-sectional view of a motor-driven compressor according to one embodiment.

As shown in FIG. 1, a vehicle air conditioner 100 includes a motor-driven compressor 10 and an external refrigerant circuit 101. The external refrigerant circuit 101 supplies refrigerant, which is fluid, to the motor-driven compressor 10. The external refrigerant circuit 101 includes, for example, a heat exchanger, an expansion valve, and the like (neither is shown). The motor-driven compressor 10 compresses the refrigerant, and the external refrigerant circuit 101 performs heat exchange of the refrigerant and expands the refrigerant. This allows the vehicle air conditioner 100 to cool or warm the passenger compartment.

The vehicle air conditioner 100 includes an air conditioning electronic control unit (ECU) 102. The air conditioning ECU 102 controls the entire vehicle air conditioner 100. The air conditioning ECU 102 is configured to obtain the temperature of the passenger compartment, a target temperature of the passenger compartment that is set by a user, and the like. The air conditioning ECU 102 sends various types of commands such as an ON-OFF command to the motor-driven compressor 10 based on the parameters such as the temperature of the passenger compartment and the target temperature.

Motor-Driven Compressor

The motor-driven compressor 10 includes a housing 11, a rotary shaft 12, a compression unit 13 that compresses refrigerant, a motor 14 that drives the compression unit 13, and an inverter device 15 that drives the motor 14.

The housing 11 accommodates the rotary shaft 12, the compression unit 13, the motor 14, and the inverter device 15. The housing 11 is made of metal. The housing 11 of the present embodiment is made of aluminum. The housing 11 is grounded to the body of the vehicle. The housing 11 includes a suction housing member 21, a discharge housing member 22, and an inverter housing member 23. The suction housing member 21 includes a flat end wall 24 and a peripheral wall 25 that is tubular and that extends from an outer circumferential portion of the end wall 24.

Figure 2:
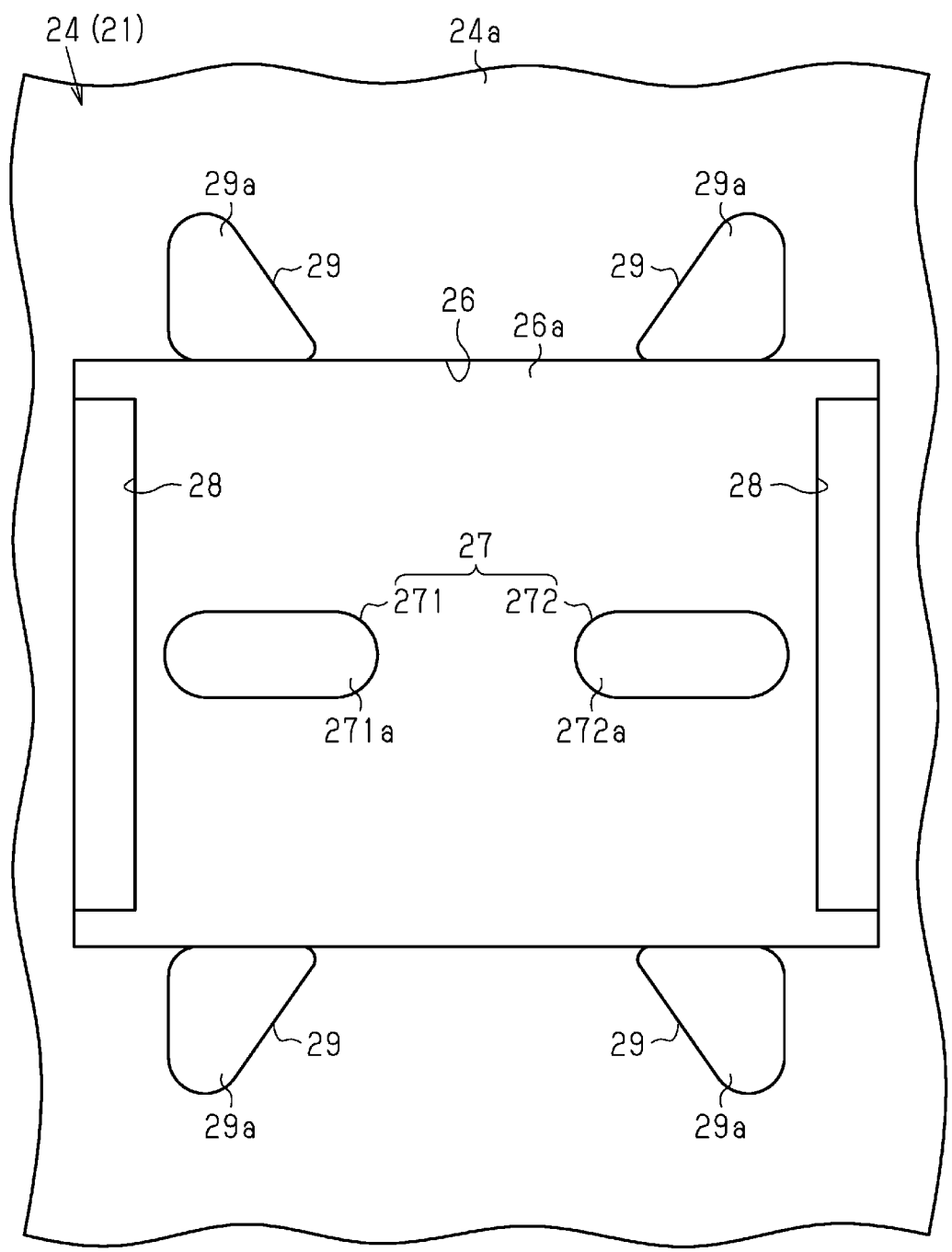
FIG. 2 is a plan view of an outer surface of an end wall of a suction housing member included in the motor-driven compressor in FIG. 1.
Figure 3:
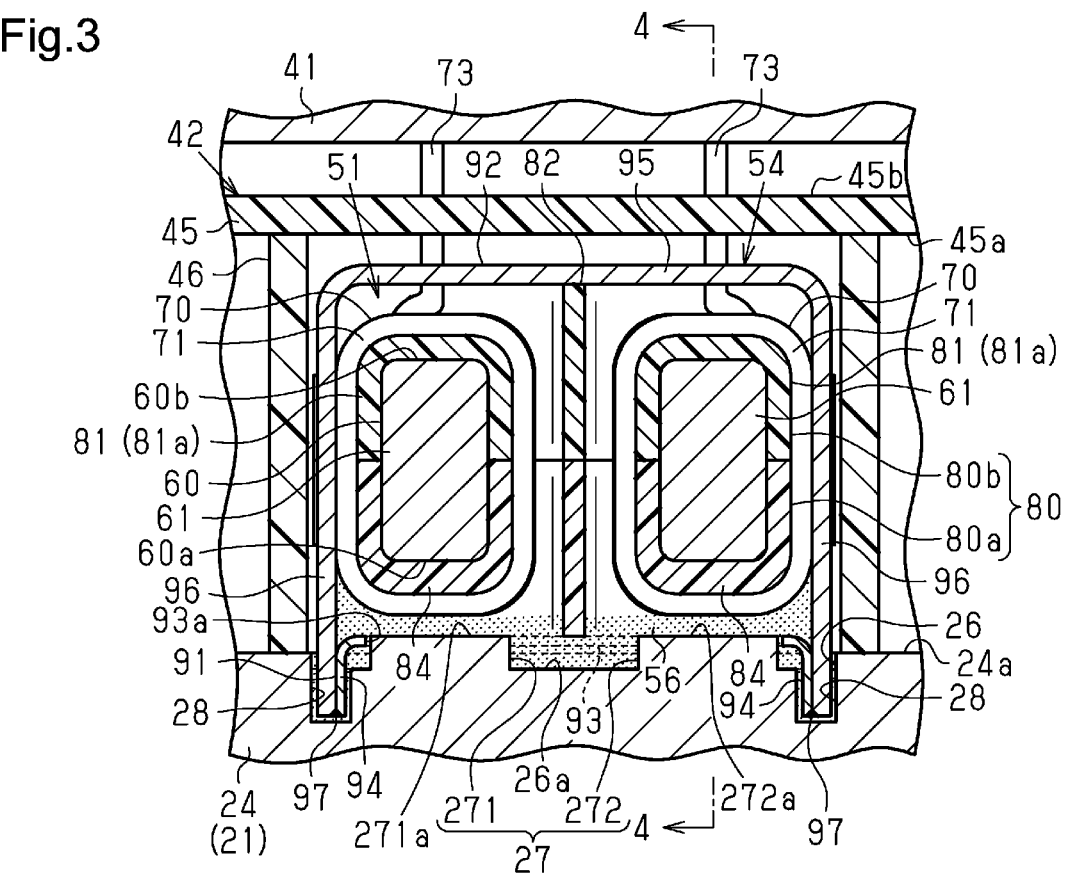
FIG. 3 is a cross-sectional view illustrating part of the motor-driven compressor in FIG. 1.
Figure 4:
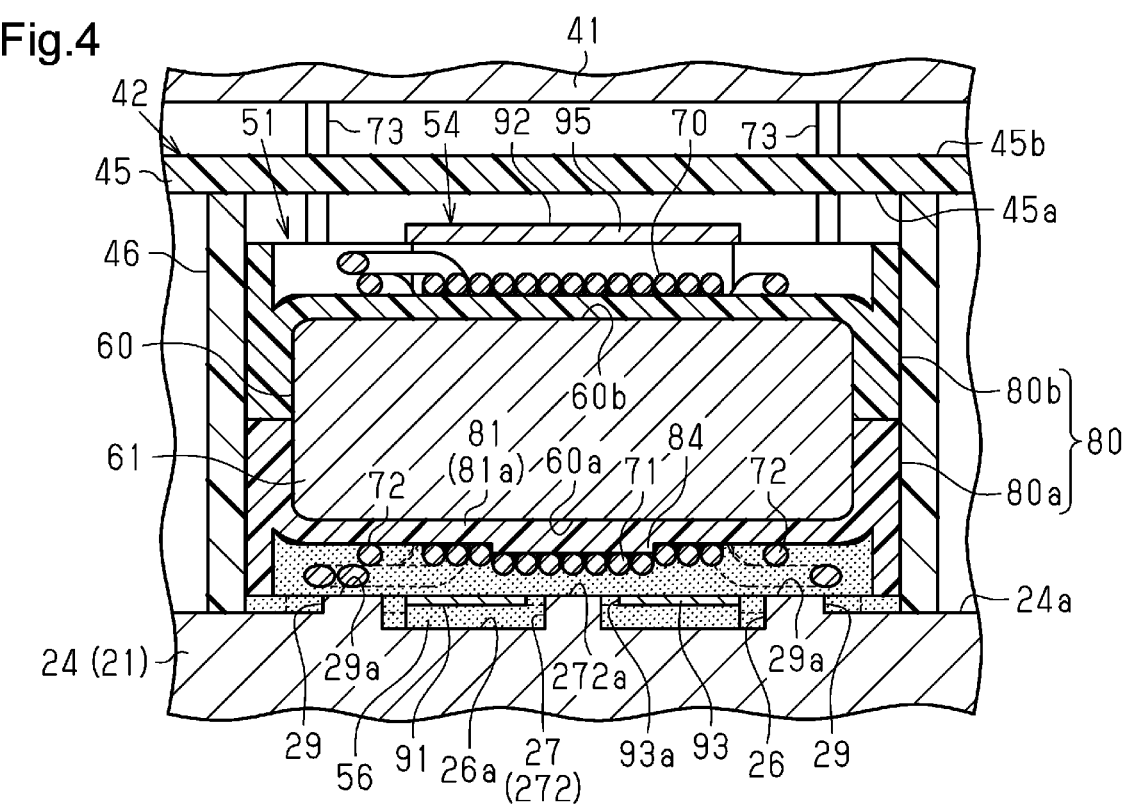
FIG. 4 is a cross-sectional view taken along line 4-4 in FIG. 3, illustrating part of the motor-driven compressor in FIG. 1.

As shown in FIGS. 2 to 4, the suction housing member 21 includes a recess 26 that is recessed from an outer surface 24a of the end wall 24. The recess 26 is rectangular.

The suction housing member 21 includes a first projection 27 that projects from a bottom surface 26a of the recess 26. The first projection 27 is located in the middle in the transverse direction of the recess 26. The first projection 27 of the present embodiment includes a first projecting portion 271 and a second projecting portion 272 that are divided in the longitudinal direction of the recess 26. The first projecting portion 271 and the second projecting portion 272 each have the shape of a stadium, which is elongated in, for example, the longitudinal direction of the recess 26. In the present embodiment, the first projecting portion 271 includes a distal end surface 271a that is a flat surface, and the second projecting portion 272 includes a distal end surface 272a that is a flat surface. Thus, the distal end surface of the first projection 27 is a flat surface. The distal end surface 271a of the first projecting portion 271 and the distal end surface 272a of the second projecting portion 272 are located on the same plane. The distal end surface 271a of the first projecting portion 271 and the distal end surface 272a of the second projecting portion 272 are located at a position projecting out of the outer surface 24a of the end wall 24.

The suction housing member 21 of the present embodiment includes two grooves 28 that are recessed from the bottom surface 26a of the recess 26. The two grooves 28 are arranged at the opposite ends of the recess 26 in the longitudinal direction of the recess 26. The grooves 28 each extend straight in the transverse direction of the recess 26.

The suction housing member 21 of the present embodiment includes four second projections 29 that project from the outer surface 24a of the end wall 24. The second projections 29 are each, for example, triangular. Two of the four second projections 29 are arranged at positions that sandwich the first projecting portion 271 in the transverse direction of the recess 26. The other two of the four second projections 29 are arranged at positions that sandwich the second projecting portion 272 in the transverse direction of the recess 26. Each second projection 29 includes a distal end surface 29a that is a flat surface. The distal end surfaces 29a of the second projections 29 are located on the same plane as the distal end surface 271a of the first projecting portion 271 and the distal end surface 272a of the second projecting portion 272.

As shown in FIG. 1, the discharge housing member 22 is coupled to an open end of the suction housing member 21. The discharge housing member 22 closes the opening of the suction housing member 21. The suction housing member 21 and the discharge housing member 22 define a suction chamber S1. The suction chamber S1 accommodates the rotary shaft 12, the compression unit 13, and the motor 14. The motor 14 is arranged in the suction chamber S1 between the compression unit 13 and the end wall 24 of the suction housing member 21.

The inverter housing member 23 includes a flat end wall 23a and a peripheral wall 23b that is tubular and that extends from an outer circumferential portion of the end wall 23a. The inverter housing member 23 is coupled to the end wall 24 of the suction housing member 21 by bolts B. The axial direction of the peripheral wall 23b of the inverter housing member 23 coincides with the axial direction of the peripheral wall 25 of the suction housing member 21. The end wall 24 of the suction housing member 21 and the inverter housing member 23 define an inverter accommodating chamber S2. The inverter accommodating chamber S2 accommodates the inverter device 15.

A connector 16 is attached to the end wall 23a of the inverter housing member 23. The connector 16 is electrically connected to a power storage device 103 installed in the vehicle. The power storage device 103 is a power supply that supplies power to devices installed in the vehicle. The power storage device 103 is a direct-current power supply. The power storage device 103 is, for example, a rechargeable battery or a capacitor.

The housing 11 includes a suction port 11a. The suction port 11a is formed in the peripheral wall 25 of the suction housing member 21. The suction port 11a is arranged in a portion of the peripheral wall 25 of the suction housing member 21 that is closer to the end wall 24 than to the discharge housing member 22. The housing 11 also includes a discharge port 11b. The discharge port 11b is formed in the discharge housing member 22. The suction port 11a is connected to one end of the external refrigerant circuit 101, and the discharge port 11b is connected to the other end of the external refrigerant circuit 101.

The rotary shaft 12 is rotatably supported by the housing 11. The axial direction of the rotary shaft 12 coincides with the axial direction of the peripheral wall 25 of the suction housing member 21 and the peripheral wall 23b of the inverter housing member 23.

The compression unit 13 is coupled to the rotary shaft 12. The compression unit 13 compresses refrigerant in accordance with rotation of the rotary shaft 12. The compression unit 13 is of a scroll type including a stationary scroll (not shown), which is fixed in, for example, the suction housing member 21, and an orbiting scroll (not shown), which is interleaved with the stationary scroll.

The motor 14 includes a rotor 31 and a stator 32.

The rotor 31 includes a cylindrical rotor core 33 and a permanent magnet (not shown) arranged in the rotor core 33. The rotary shaft 12 is inserted into the rotor core 33. The rotary shaft 12 is fixed to the rotor core 33. The rotary shaft 12 is rotatable integrally with the rotor 31.

The stator 32 is opposed to the rotor 31 in the radial direction of the rotary shaft 12. The stator 32 includes a cylindrical stator core 34, a u-phase coil 35$u$, a v-phase coil 35$v$, and a w-phase coil 35$w$. The stator core 34 is fixed to the inner peripheral surface of the peripheral wall 25 of the suction housing member 21. The u-phase coil 35$u$, the v-phase coil 35$v$, and the w-phase coil 35$w$ are wound around the stator core 34. The u-phase coil 35$u$, the v-phase coil 35$v$, and the w-phase coil 35$w$ are connected to form, for example, a Y-connection. The u-phase coil 35$u$, the v-phase coil 35$v$, and the w-phase coil 35$w$ may be connected in any manner instead of the Y-connection. For example, the u-phase coil 35$u$, the v-phase coil 35$v$, and the w-phase coil 35$w$ may be connected to form a delta-connection.

When the u-phase coil 35$u$, the v-phase coil 35$v$, and the w-phase coil 35$w$ are energized in a predetermined pattern, the rotor 31 rotates. The rotation of the rotor 31 rotates the rotary shaft 12. This drives the compression unit 13. Thus, the motor 14 drives the compression unit 13. The compression unit 13 compresses the refrigerant drawn into the suction chamber S1 from the external refrigerant circuit 101 through the suction port 11$a$. The refrigerant compressed by the compression unit 13 is discharged to the external refrigerant circuit 101 through the discharge port 11$b$.

Inverter Device

Figure 5:
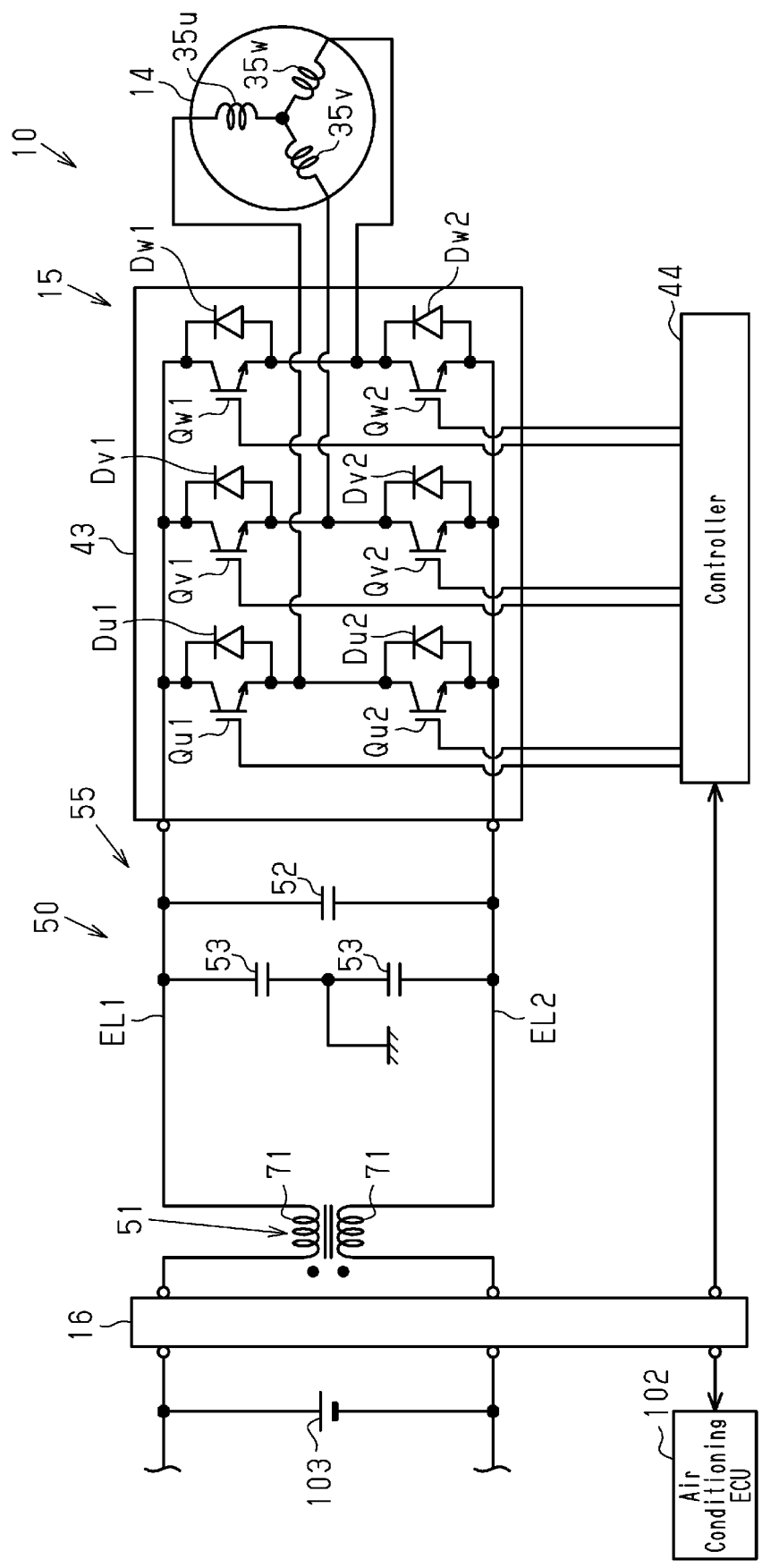
FIG. 5 is a circuit diagram of the electrical configuration of the motor-driven compressor in FIG. 1.

As shown in FIGS. 1 and 5, the inverter device 15 includes a circuit board 41, a holder 42, an inverter circuit 43, a controller 44, and a noise reduction unit 50.

As shown in FIG. 1, the circuit board 41 is arranged between the end wall 24 of the suction housing member 21 and the end wall 23$a$ of the inverter housing member 23 in the axial direction of the rotary shaft 12. The thickness direction of the circuit board 41 coincides with the axial direction of the rotary shaft 12.

The holder 42 is made of plastic. The holder 42 is arranged between the circuit board 41 and the end wall 24 of the suction housing member 21. The holder 42 includes a flat plate portion 45. The thickness direction of the plate portion 45 coincides with the thickness direction of the circuit board 41. The plate portion 45 includes a first surface 45$a$ and a second surface 45$b$. The first surface 45$a$ and the second surface 45$b$ are orthogonal to the thickness direction of the plate portion 45. The first surface 45$a$ of the plate portion 45 is opposed to the end wall 24 of the suction housing member 21. The second surface 45$b$ of the plate portion 45 is opposed to the circuit board 41. The holder 42 includes a tubular portion 46 extending from the first surface 45$a$ of the plate portion 45 toward the end wall 24 of the suction housing member 21.

The inverter circuit 43 converts direct-current power into alternating-current power. In the present embodiment, the inverter circuit 43 is held on the first surface 45$a$ of the plate portion 45 of the holder 42. The inverter circuit 43 is mounted on the circuit board 41.

As shown in FIG. 5, the inverter circuit 43 includes two connection lines EL1, EL2. The inverter circuit 43 includes u-phase switching elements Qu1, Qu2 for the u-phase coil 35$u$. The inverter circuit 43 includes v-phase switching elements Qv1, Qv2 for the v-phase coil 35$v$. The inverter circuit 43 includes w-phase switching elements Qw1, Qw2 for the w-phase coil 35$w$. Each of the switching elements Qu1 to Qw2 is, for example, a power switching element such as an IGBT. The switching elements Qu1, Qu2, Qv1, Qv2, Qw1, Qw2 are respectively connected to freewheeling diodes Du1, Du2, Dv1, Dv2, Dw1, Dw2.

The u-phase switching elements Qu1, Qu2 are connected in series to each other. The connection node between the u-phase switching elements Qu1, Qu2 is connected to the u-phase coil 35$u$. The series connection (leg) of the u-phase switching elements Qu1, Qu2 is electrically connected to the connection lines EL1, EL2. The v-phase switching elements Qv1, Qv2 are connected in series to each other. The connection node between the v-phase switching elements Qv1, Qv2 is connected to the v-phase coil 35$v$. The series connection of the v-phase switching elements Qv1, Qv2 is electrically connected to the connection lines EL1, EL2. The w-phase switching elements Qw1, Qw2 are connected in series to each other. The connection node between the w-phase switching elements Qw1, Qw2 is connected to the w-phase coil 35$w$. The series connection of the w-phase switching elements Qw1, Qw2 is electrically connected to the connection lines EL1, EL2.

The series connection of the u-phase switching elements Qu1, Qu2, the series connection of the v-phase switching elements Qv1, Qv2, and the series connection of the w-phase switching elements Qw1, Qw2 are connected in parallel with one another between the connection lines EL1, EL2.

The controller 44, which is processing circuitry, includes, for example, at least one dedicated hardware circuit and/or at least one processor (control circuit) that operates in accordance with a computer program (software). The processor includes a CPU and memory such as RAM and ROM. The memories store program codes or commands configured to cause the processor to execute various types of processes. The memory, or computer readable medium, includes any type of medium that is accessible by general-purpose computers and dedicated computers.

The controller 44 controls the inverter circuit 43. The controller 44 controls switching operations of each of the switching elements Qu1 to Qw2. The controller 44 is electrically connected to the air conditioning ECU 102 by the connector 16. Based on commands from the air conditioning ECU 102, the controller 44 periodically turns on and off each of the switching elements Qu1 to Qw2. Specifically, based on commands from the air conditioning ECU 102, the controller 44 performs pulse width modulation control (PWM control) on each of the switching elements Qu1 to Qw2. More specifically, the controller 44 uses a carrier signal (carrier wave signal) and a commanded voltage value signal (signal for comparison) to generate control signals. Then, the controller 44 uses the generated control signals and converts direct-current power into alternating-current power by performing ON/OFF control on each of the switching elements Qu1 to Qw2.

The noise reduction unit 50 is arranged at the input side of the inverter circuit 43. The noise reduction unit 50 reduces common mode noise and normal mode noise included in the direct-current power input to the inverter circuit 43.

As shown in FIG. 1, the noise reduction unit 50 includes a common mode choke coil 51, a smoothing capacitor 52, two Y-capacitors 53, and a conductor 54.

As shown in FIG. 5, the smoothing capacitor 52 and the common mode choke coil 51 form a low-pass filter circuit 55. The low-pass filter circuit 55 is arranged on the connection lines EL1, EL2. The low-pass filter circuit 55 is arranged between the connector 16 and the inverter circuit 43 in terms of circuitry. The common mode choke coil 51 is arranged on the connection lines EL1, EL2.

The smoothing capacitor 52 is arranged between the common mode choke coil 51 and the inverter circuit 43. The smoothing capacitor 52 is an X capacitor connected in parallel with the inverter circuit 43. The smoothing capacitor 52 is electrically connected to the connection lines EL1, EL2. The common mode choke coil 51 and the smoothing capacitor 52 form an LC resonance circuit. Thus, the low-pass filter circuit 55 of the present embodiment is an LC resonance circuit including the common mode choke coil 51.

The two Y-capacitors 53 are connected in series to each other. The connection node between the two Y-capacitors 53 is grounded to the body of the vehicle through the housing 11. The two Y-capacitors 53 are arranged between the common mode choke coil 51 and the inverter circuit 43. The two Y-capacitors 53 are connected in parallel with the common mode choke coil 51 and the smoothing capacitor 52. The two Y-capacitors 53 are located between the common mode choke coil 51 and the smoothing capacitor 52.

Common Mode Choke Coil

The common mode choke coil 51 limits transmission of high-frequency noise generated in the vehicle to the inverter circuit 43 of the motor-driven compressor 10. The common mode choke coil 51 reduces common mode noise. The common mode choke coil 51 uses a leakage inductance as a normal inductance. Thus, the common mode choke coil 51 is used as the L component in the low-pass filter circuit (LC filter) 55 that eliminates normal mode noise (differential mode noise). That is, the common mode choke coil 51 is configured to reduce the common mode noise and the normal mode noise (differential mode noise). Thus, in the motor-driven compressor 10 of the present embodiment, the common mode choke coil 51 reduces two types of mode noise without separately using a common mode choke coil and a normal mode (differential mode) choke coil.

Figure 6:
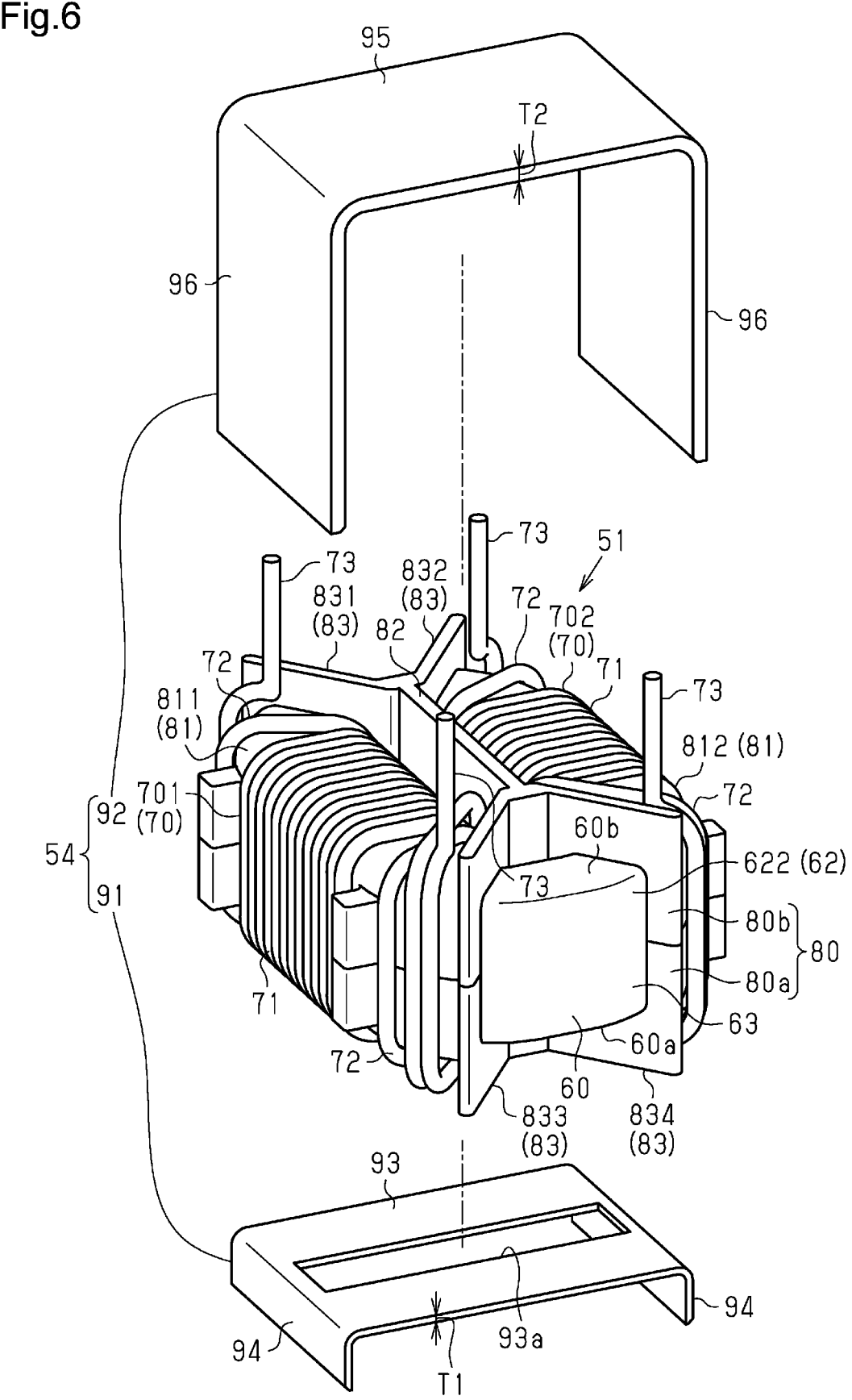
FIG. 6 is an exploded perspective view of a common mode choke coil and a conductor included in the motor-driven compressor in FIG. 1.
Figure 7:
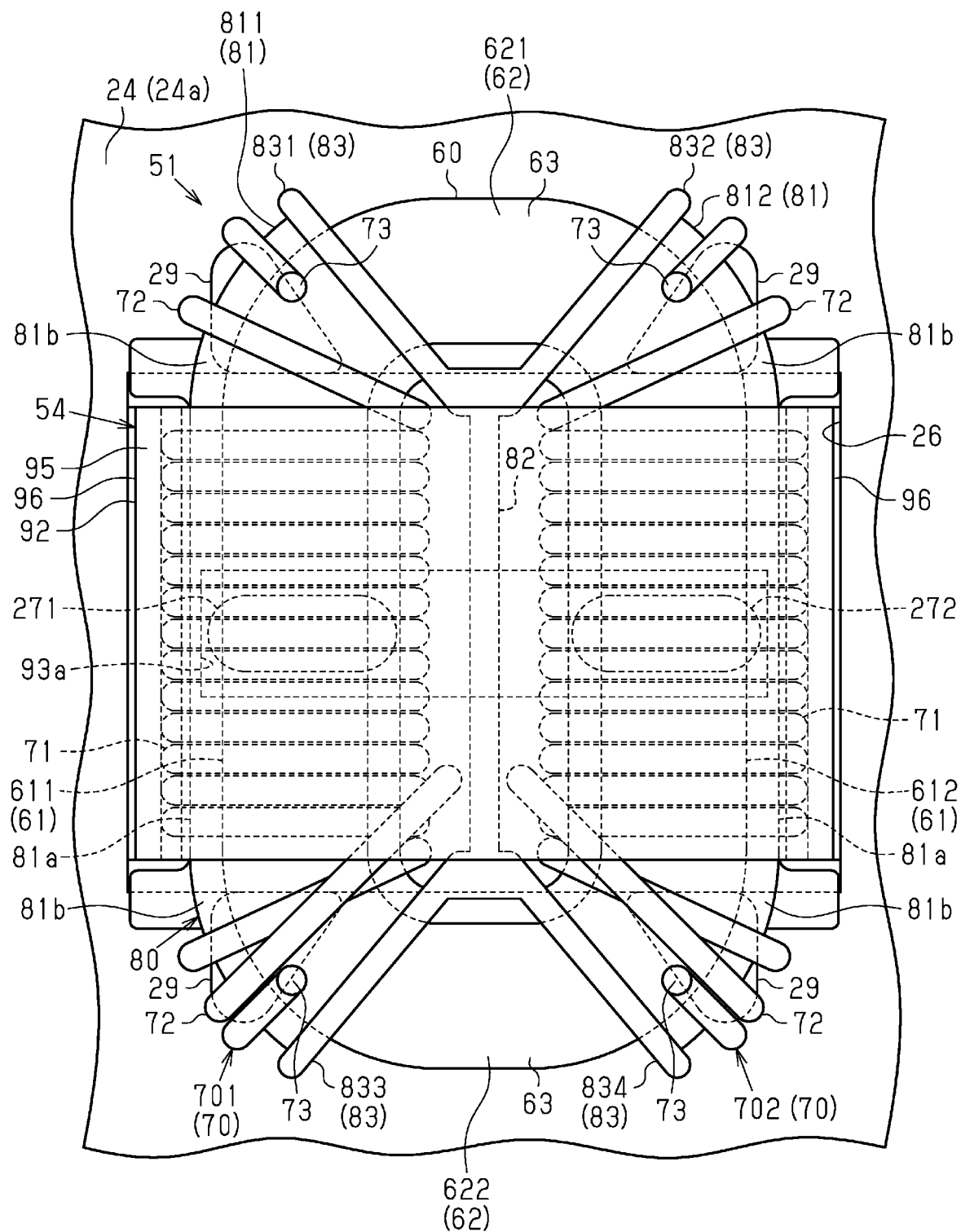
FIG. 7 is a plan view of the end wall of the suction housing member, the common mode choke coil, and the conductor included in the motor-driven compressor in FIG. 1.

As shown in FIGS. 6 and 7, the common mode choke coil 51 includes a looped core 60, two windings 70, and an insulating member 80. The core 60 is an endless loop. The core 60 is made of a ferromagnetic material. The core 60 is, for example, a ferrite core. The insulating member 80 is made of plastic. In the following description, one of the two windings 70 may be referred to as a first winding 701, and the other one of the two windings 70 may be referred to as a second winding 702.

As shown in FIG. 7, the core 60 of the present embodiment is stadium-shaped and looped. The core 60 includes two straight portions 61 and two arcuate portions 62. In the following description, one of the two straight portions 61 may be referred to as a first straight portion 611, and the other one of the two straight portions 61 may be referred to as a second straight portion 612. Further, one of the two arcuate portions 62 may be referred to as a first arcuate portion 621 and the other one of the two arcuate portions 62 may be referred to as a second arcuate portion 622. The straight portions 61 each extend straight. The two straight portions 61 extend in parallel with each other. The arcuate portions 62 each extend arcuately. The two arcuate portions 62 each connect corresponding ends of the two straight portions 61 to each other. Specifically, the first arcuate portion 621 connects one end of the first straight portion 611 to one end of the second straight portion 612, and the second arcuate portion 622 connects the other end of the first straight portion 611 to the other end of the second straight portion 612.

As shown in FIG. 6, the core 60 includes a first end surface 60a and a second end surface 60b. The first end surface 60a is one end surface of the core 60 in the axial direction, and the second end surface 60b is the other end surface of the core 60 in the axial direction.

The two windings 70 are wound around the core 60. The first winding 701 is wound around the first straight portion 611, and the second winding 702 is wound around the second straight portion 612. The second winding 702 is spaced apart from the first winding 701 in the circumferential direction of the core 60. Specifically, the second winding 702 is spaced apart from the first winding 701 by 180° in the circumferential direction of the core 60 so that the second winding 702 is opposed to the first winding 701 in the radial direction of the core 60. The first winding 701 and the second winding 702 are spaced apart from each other and aligned in a direction orthogonal to the axis of the core 60.

The windings 70 each include a first coil portion 71 wound around the straight portion 61. In the present embodiment, each winding 70 is also wound around part of the two arcuate portions 62. Each winding 70 includes two second coil portions 72 wound around the two arcuate portions 62. The two second coil portions 72 are located at the opposite sides of the first coil portion 71. Each winding 70 includes two lead portions 73 laid out from the second end surface 60b of the core 60. The core 60 includes a winding-free portion 63 that is free from the winding 70. The winding-free portion 63 of the present embodiment is a portion of each arcuate portion 62 that is free from the winding 70.

The insulating member 80 includes two core insulating portions 81, a winding insulating portion 82, and four connection portions 83. In the following description, one of the two core insulating portions 81 may be referred to as a first core insulating portion 811, and the other one of the two core insulating portions 81 may be referred to as a second core insulating portion 812. One of the four connection portions 83 may be referred to as a first connection portion 831, another one may be referred to as a second connection portion 832, still another one may be referred to as a third connection portion 833, and the remaining one may be referred to as a fourth connection portion 834.

The core insulating portions 81 are each looped. The two core insulating portions 81 cover portions of the core 60 around which the windings 70 are wound. The core insulating portions 81 each include a first covering portion 81a that covers the entire straight portion 61 and second covering portions 81b that are located at the opposite sides of the first covering portion 81a and cover part of the two arcuate portions 62. The two windings 70 are wound around the core 60 to which the insulating member 80 is attached. The two core insulating portions 81 are arranged between the core 60 and the two windings 70. The two core insulating portions 81 insulate the two windings 70 from the core 60. The winding-free portion 63 of the core 60 is not covered by the insulating member 80.

The winding insulating portion 82 is flat. The winding insulating portion 82 is located at the inner side of the core 60. The winding insulating portion 82 is arranged between the first winding 701 and the second winding 702. The winding insulating portion 82 insulates the second winding 702 from the first winding 701. The size of the winding insulating portion 82 in the axial direction of the core 60 is greater than the size of each winding 70 in the axial direction of the core 60.

The four connection portions 83 connect the two core insulating portions 81 to the winding insulating portion 82. The first connection portion 831 connects a first end of the winding insulating portion 82 in the longitudinal direction to a first end of the first core insulating portion 811. The second connection portion 832 connects the first end of the winding insulating portion 82 to a first end of the second core insulating portion 812. The third connection portion 833 connects a second end of the winding insulating portion 82 in the longitudinal direction to a second end of the first core insulating portion 811. The fourth connection portion 834 connects the second end of the winding insulating portion 82 to a second end of the second core insulating portion 812. The four connection portions 83 integrate the two core insulating portions 81 with the winding insulating portion 82.

The insulating member 80 includes a first segment 80a and a second segment 80b that are segmented in the axial direction of the core 60. The first segment 80a is coupled to the core 60 from the side at which the first end surface 60a of the core 60 is located. The second segment 80b is coupled to the core 60 from the side at which the second end surface 60b of the core 60 is located.

As shown in FIGS. 3 and 4, the core insulating portions 81 of the present embodiment each include a bulging portion 84. The first covering portion 81a includes a first surface that is opposed to the first end surface 60a of the core 60 and a second surface at the opposite side of the first surface. The bulging portion 84 bulges from the second surface of the first covering portion 81a. Thus, a portion of the first covering portion 81a that covers the first end surface 60a of the core 60 is thicker than a portion of the first covering portion 81a that covers the second end surface 60b of the core 60.

Conductor

As shown in FIG. 3, the conductor 54 is looped. In other words, the conductor 54 is an endless loop. The conductor 54 surrounds the two windings 70. In the present embodiment, the conductor 54 surrounds the two windings 70 so that the axial direction of the conductor 54 is orthogonal to the axial direction of the core 60. That is, the axial direction of the conductor 54 is parallel to the direction in which the two straight portions 61 of the core 60 extend.

As shown in FIGS. 4 and 7, the two straight portions 61 of the core 60 and the first coil portion 71 of each winding 70 are located at the inner side of the conductor 54. The two arcuate portions 62 of the core 60 and the two second coil portions 72 of each winding 70 are located at the opposite sides of the conductor 54 in the axial direction. That is, the two arcuate portions 62 of the core 60 and the two second coil portions 72 of each winding 70 are located at the outer sides of the conductor 54.

As shown in FIG. 6, the conductor 54 of the present embodiment includes an elongated first metal plate 91 and an elongated second metal plate 92 that are segmented in the circumferential direction. The material of the first metal plate 91 differs from the material of the second metal plate 92. The material of the second metal plate 92 has a higher thermal conductivity than the material of the first metal plate 91. For example, the first metal plate 91 is made of copper. The second metal plate 92 is made of phosphor bronze. The first metal plate 91 has a thickness T1 that is fixed in the entire longitudinal direction. The second metal plate 92 has a thickness T2 that is fixed in the entire longitudinal direction. The thickness T1 of the first metal plate 91 is less than the thickness T2 of the second metal plate 92.

The first metal plate 91 includes a first body portion 93 and two first extending portions 94. The first body portion 93 is rectangular and flat. The two first extending portions 94 extend in the thickness direction of the first body portion 93 from the opposite ends of the first body portion 93 in the longitudinal direction. The two first extending portions 94 extend in parallel with each other. The first extending portions 94 are each rectangular and flat. The first metal plate 91 is formed by pressing a single metal plate. A through-hole 93a is formed in the first body portion 93. The through-hole 93a extends through the first body portion 93 in the thickness direction, that is, the axial direction of the core 60. The through-hole 93a is, for example, rectangular.

The second metal plate 92 includes a second body portion 95 and two second extending portions 96. The second body portion 95 is rectangular and flat. The two second extending portions 96 extend in the thickness direction of the second body portion 95 from the opposite ends of the second body portion 95 in the longitudinal direction. The two second extending portions 96 extend in parallel with each other. The second extending portions 96 are each rectangular and flat. The second metal plate 92 is formed by pressing a single metal plate.

As shown in FIG. 3, the first metal plate 91 is located between the two second extending portions 96 of the second metal plate 92. The direction in which the two first extending portions 94 extend from the first body portion 93 is the same as the direction in which the two second extending portions 96 extend from the second body portion 95. The two first extending portions 94 overlap the distal ends of the two second extending portions 96. The distal ends of the two first extending portions 94 and the distal ends of the two second extending portions 96 are joined with one another at joining portions 97. In the present embodiment, the distal ends of the two first extending portions 94 and the distal ends of the two second extending portions 96 are joined with one another through resistance welding. The conductor 54 is shaped into a loop by joining the two first extending portions 94 and the two second extending portions 96 with one another.

As shown in FIGS. 3 and 4, the common mode choke coil 51 and the conductor 54 are accommodated in a space defined by the first surface 45a of the plate portion 45 of the holder 42 and the inner peripheral surface of the tubular portion 46.

The axial direction of the core 60 coincides with the thickness direction of the plate portion 45 and the axial direction of the tubular portion 46. The first end surface 60a of the core 60 is arranged toward the side at which the end wall 24 of the suction housing member 21 is located. The second end surface 60b of the core 60 is arranged toward the side at which the plate portion 45 is located. The two lead portions 73 of each winding 70 extend through the plate portion 45 to be laid out to the side at which the second surface 45b of the plate portion 45 is located. The two lead portions 73, which is laid out, are, for example, soldered to the circuit board 41. Thus, the common mode choke coil 51 is electrically connected to the circuit board 41.

The first body portion 93 of the conductor 54 is located between the first coil portions 71 of the two windings 70 and the end wall 24 of the suction housing member 21. Thus, the first body portion 93 serves as a housing-side conductor portion located between the two windings 70 and the housing 11.

The bulging portion 84 bulges toward the end wall 24 from the portion of the first covering portion 81a of the core insulating portion 81 that covers the first end surface 60a of the core 60. The portion of the first covering portion 81a of the core insulating portion 81 that covers the first end surface 60a of the core 60 is located at the opposite side of the first coil portion 71 of the winding 70 from the first body portion 93. That is, the bulging portion 84 bulges toward the end wall 24 from a portion of the core insulating portion 81 located at the opposite side of the winding 70 from the first body portion 93.

The first body portion 93 is located above the recess 26. The longitudinal direction and the transverse direction of the first body portion 93 respectively coincide with the longitudinal direction and the transverse direction of the recess 26. The two first extending portions 94 extend from the first body portion 93 toward the end wall 24 of the suction housing member 21. The second body portion 95 is located between the first coil portions 71 of the two windings 70 and the plate portion 45. The two second extending portions 96 extend from the second body portion 95 toward the end wall 24 of the suction housing member 21. The distal ends of the two first extending portions 94 and the distal ends of the two second extending portions 96 are inserted into the two grooves 28. The joining portions 97 of the distal ends of the two first extending portions 94 and the distal ends of the two second extending portions 96 are located in the grooves 28.

As shown in FIGS. 3 and 7, the first projecting portion 271 projects from the bottom surface 26a of the recess 26 toward the first coil portion 71 of the first winding 701. The second projecting portion 272 projects from the bottom surface 26a of the recess 26 toward the first coil portion 71 of the second winding 702. That is, the first projection 27 projects from the bottom surface 26a of the recess 26 toward the first coil portions 71 of the two windings 70. The first projection 27 is inserted into the through-hole 93a. In the present embodiment, the distal end surface 271a of the first projecting portion 271 and the distal end surface 272a of the second projecting portion 272 are located on the same plane as the surface of the first body portion 93 that is opposed to the two windings 70.

As shown in FIGS. 4 and 7, the second projections 29 each project from the outer surface 24a of the end wall 24 toward the second coil portions 72 of the windings 70.

As shown with stippling in FIGS. 3 and 4, thermal paste 56, which serves as a thermal interface material, is applied between the first coil portion 71 of each winding 70 and the first body portion 93 of the conductor 54. The first coil portions 71 are electrically insulated from the first body portion 93 through the thermal paste 56 and thermally connected to the first body portion 93 through the thermal paste 56. The thermal paste 56 is also applied between the first coil portion 71 of each winding 70 and the first projection 27. The first projection 27 is opposed to the first coil portions 71 of the two windings 70 through the thermal paste 56. The first coil portions 71 are electrically insulated from the suction housing member 21 through the thermal paste 56 and thermally connected to the suction housing member 21 through the thermal paste 56.

The thermal paste 56 is also applied between the second coil portions 72 of each winding 70 and the corresponding second projections 29. The second projections 29 are each opposed to the corresponding second coil portions 72 of the windings 70 through the thermal paste 56. The second coil portions 72 are electrically insulated from the suction housing member 21 through the thermal paste 56 and thermally connected to the suction housing member 21 through the thermal paste 56.

Further, the thermal paste 56 is applied between the conductor 54 and the suction housing member 21. Specifically, the thermal paste 56 is applied between the surface of the first body portion 93 that is opposed to the end wall 24 and the bottom surface 26a of the recess 26. The thermal paste 56 is also applied to the inner side of the through-hole 93a. The thermal paste 56 is also applied between the inner surfaces of the grooves 28 and a group of the distal ends of the first extending portions 94 and the distal ends of the second extending portions 96. Thus, the conductor 54 is electrically insulated from the suction housing member 21 through the thermal paste 56 and thermally connected to the suction housing member 21 through the thermal paste 56.

Operation of Present Embodiment

The noise reduction unit 50 includes the looped conductor 54 surrounding the two windings 70 of the common mode choke coil 51. When a normal mode current flows through the two windings 70, a leakage magnetic flux is generated from the core 60. Then, an induced current flows in the conductor 54 in the circumferential direction of the conductor 54 to resist changes in the leakage magnetic flux from the core 60. The induced current flowing through the conductor 54 is converted into thermal energy to generate a damping effect. This lowers the resonance peak of the low-pass filter circuit 55.

When current flows through the two windings 70, the two windings 70 generate heat. The heat of the two windings 70 is dissipated to the housing 11 as follows.

The conductor 54 includes the first body portion 93 located between the two windings 70 and the end wall 24 of the suction housing member 21. Thus, the heat of the first coil portions 71 of the two windings 70 is transferred to the first body portion 93 through the thermal paste 56. The heat transferred to the first body portion 93 is dissipated to the bottom surface 26a of the recess 26 through the thermal paste 56, or dissipated to the inner surfaces of the grooves 28 by the first extending portions 94 and the thermal paste 56. That is, the heat of the first coil portions 71 is dissipated to the suction housing member 21 through the conductor 54.

The conductor 54 includes the through-hole 93a extending through the first body portion 93 in the axial direction of the core 60. Thus, the heat of the first coil portions 71 of the two windings 70 is dissipated to the suction housing member 21 through the thermal paste 56. The suction housing member 21 includes the first projection 27 that is inserted into the through-hole 93a and opposed to the two windings 70. This reduces the distance from the first coil portions 71 of the two windings 70 to the suction housing member 21 and improves the heat dissipation performance of the first coil portions 71.

The heat of the second coil portions 72 of each winding 70 is dissipated to the suction housing member 21 through the thermal paste 56. The suction housing member 21 includes the second projections 29, which project from the outer surface 24a of the end wall 24 toward the second coil portions 72 of each winding 70. This reduces the distance from the second coil portions 72 of the two windings 70 to the suction housing member 21 and improves the heat dissipation performance of the second coil portions 72.

Advantages of Present Embodiment

The present embodiment has the following advantages.

(1) The conductor 54 includes the first body portion 93 located between the two windings 70 and the end wall 24 of the suction housing member 21. The first body portion 93 includes the through-hole 93a extending through the first body portion 93 in the axial direction of the core 60. The suction housing member 21 includes the first projection 27 that is inserted into the through-hole 93a and opposed to the two windings 70. This reduces the distance from the two windings 70 to the suction housing member 21 and improves the heat dissipation performance of the two windings 70.

(2) The distal end surface of the first projection 27 is a flat surface. Thus, for example, compared to when the distal end surfaces of the first projection 27 are inclined surfaces or uneven surfaces, the distance from the windings 70 to the distal end surfaces of the first projection 27 easily becomes even in the planar direction of the distal end surfaces of the first projection 27. This suppresses fluctuation of the heat dissipation performance of the windings 70.

(3) The common mode choke coil 51 includes the winding insulating portion 82 that is arranged between the first winding 701 and the second winding 702 to insulate the first winding 701 from the second winding 702. The first projection 27 is divided into the first projecting portion 271 that is opposed to the first winding 701 and the second projecting portion 272 that is opposed to the second winding 702. The winding insulating portion 82 is located between the first projecting portion 271 and the second projecting portion 272. This avoids interference between the first projection 27 and the winding insulating portion 82.

(4) The core 60 is stadium-shaped and looped, including the two straight portions 61, extending in parallel with each other, and the two arcuate portions 62, each connecting corresponding ends of the two straight portions 61 to each other and located at the outer sides of the conductor 54. Each winding 70 includes the first coil portion 71, located at the inner side of the conductor 54 and wound around one of the two straight portions 61, and the two second coil portions 72 wound respectively around the two arcuate portions 62. Since each winding 70 includes the second coil portions 72, the path of a leakage magnetic flux is closed compared to when the winding 70 does not include the second coil portions 72. This avoids a decrease in a leakage inductance even when the common mode choke coil 51 is accommodated in the inverter accommodating chamber S2 in proximity to the housing 11.

The suction housing member 21 includes the second projections 29 projecting toward the second coil portions 72. This reduces the distance from the second coil portions 72 to the suction housing member 21 and improves the heat dissipation performance of the second coil portions 72. Thus, the heat dissipation performance of the windings 70 is further improved.

Further, the distal end surfaces 29a of the second projections 29 are flat surfaces. Thus, for example, compared to when the distal end surfaces 29a of the second projections 29 are inclined surfaces or uneven surfaces, the distance from the second coil portions 72 to the distal end surfaces 29a of the second projections 29 easily becomes even in the planar direction of the distal end surfaces 29a of the second projections 29. This suppresses fluctuation of the heat dissipation performance of the second coil portions 72.

(5) The common mode choke coil 51 includes the core insulating portion 81 that is arranged between the core 60 and the windings 70 to insulate the core 60 from the windings 70. The core insulating portion 81 includes the bulging portion 84 that bulges toward the end wall 24 from the portion of the core insulating portion 81 located at the opposite side of the winding 70 from the first body portion 93. This further reduces the distance from the windings 70 to the suction housing member 21 as the windings 70 are closer to the suction housing member 21 with the bulging portion 84. Thus, the heat dissipation performance of the windings 70 is further improved.

(6) The thermal paste 56 is applied between the first coil portions 71 and the first body portion 93 and between the first coil portions 71 and the first projection 27. Thus, for example, compared to when there is a void between the first coil portions 71 and the first body portion 93 and between the first coil portions 71 and the first projection 27, the heat of the first coil portions 71 is easily dissipated to the first body portion 93 and the first projection 27. Further, the thermal paste 56 is also applied between the second coil portions 72 and the second projections 29. Thus, for example, compared to when there is a void between the second coil portions 72 and the second projections 29, the heat of the second coil portions 72 is easily dissipated to the second projections 29.

(7) When an induced current flows in the conductor 54, the conductor 54 generates heat. The heat of the conductor 54 is dissipated to the suction housing member 21. The conductor 54 of the present embodiment includes the first metal plate 91 and the second metal plate 92 segmented in the circumferential direction. The first metal plate 91 includes the first body portion 93 located between the two windings 70 and the end wall 24. The second metal plate 92 includes the second body portion 95 located at the opposite side of the two windings 70 from the end wall 24. Thus, the heat dissipation performance from the first metal plate 91 to the suction housing member 21 is superior to the heat dissipation performance from the second metal plate 92 to the suction housing member 21.

In the present embodiment, the thickness T1 of the first metal plate 91 is less than the thickness T2 of the second metal plate 92. Thus, the electric resistance of the first metal plate 91 is greater than the electric resistance of the second metal plate 92. Thus, heat generated in the conductor 54 is likely to concentrate on the first metal plate 91, which has better heat dissipation performance than the second metal plate 92. As a result, the heat of the conductor 54 can be efficiently dissipated to the suction housing member 21.

In the present embodiment, the second metal plate 92 includes the two second extending portions 96 extending from the second body portion 95 and thermally connected to the suction housing member 21. The thickness T2 of the second metal plate 92 is greater than the thickness T1 of the first metal plate 91. Thus, the electric resistance of the second metal plate 92 is less than the electric resistance of the first metal plate 91. Further, the material of the second metal plate 92 has a higher thermal conductivity than the material of the first metal plate 91. Thus, the heat of the second metal plate 92 can be efficiently dissipated to the suction housing member 21.

(8) The first metal plate 91 includes the two first extending portions 94 extending from the first body portion 93. The distal ends of the two first extending portions 94 are inserted into the grooves 28. Thus, the heat of the first metal plate 91 can be efficiently dissipated to the suction housing member 21. Further, the distal ends of the two second extending portions 96 of the second metal plate 92 are inserted into the grooves 28. Thus, the heat of the second metal plate 92 can be efficiently dissipated to the suction housing member 21.

Modifications

The above-described embodiment may be modified as follows. The above-described embodiment and the following modifications can be combined as long as the combined modifications remain technically consistent with each other.

The housing 11 does not need to be configured as in the embodiment described above.

The housing 11 may have, for example, the following configuration. The suction housing member 21 is tubular.

The inverter housing member 23 includes a tubular housing body with a closed end and a cover. The housing body includes an end wall and a peripheral wall that is tubular and that extends from an outer circumferential portion of the end wall. The cover closes an opening of the housing body. The inverter housing member 23 is coupled to the suction housing member 21 so that the end wall of the housing body closes the opening of the suction housing member 21. The housing body and the cover define the inverter accommodating chamber S2. In this case, the first projection 27 projects from the inner surface of the end wall of the housing body toward the first coil portions 71 of the two windings 70. The second projections 29 each project from the inner surface of the end wall of the housing body toward the second coil portions 72 of each winding 70.

The recess 26 may be omitted.

The grooves 28 may be omitted.

The first projection 27 does not need to be divided into the first projecting portion 271 and the second projecting portion 272.

The first projecting portion 271 and the second projecting portion 272 do not need to be stadium-shaped.

The distal end surface 271a of the first projecting portion 271 and the distal end surface 272a of the second projecting portion 272 do not need to be flat surfaces. That is, the distal end surface of the first projection 27 does not need to be a flat surface. The distal end surface of the first projection 27 may be, for example, an inclined surface or an uneven surface.

As long as the first projection 27 is inserted into the through-hole 93a of the conductor 54, the distal end surface of the first projection 27 does not need to be located on the same plane as the surface of the first body portion 93 that is opposed to the windings 70.

The suction housing member 21 does not need to include the second projections 29.

The second projections 29 do not need to be triangular.

The distal end surfaces 29a of the second projections 29 do not need to be flat surfaces. The distal end surfaces 29a of the second projections 29 may be, for example, inclined surfaces or uneven surfaces.

Figure 8:
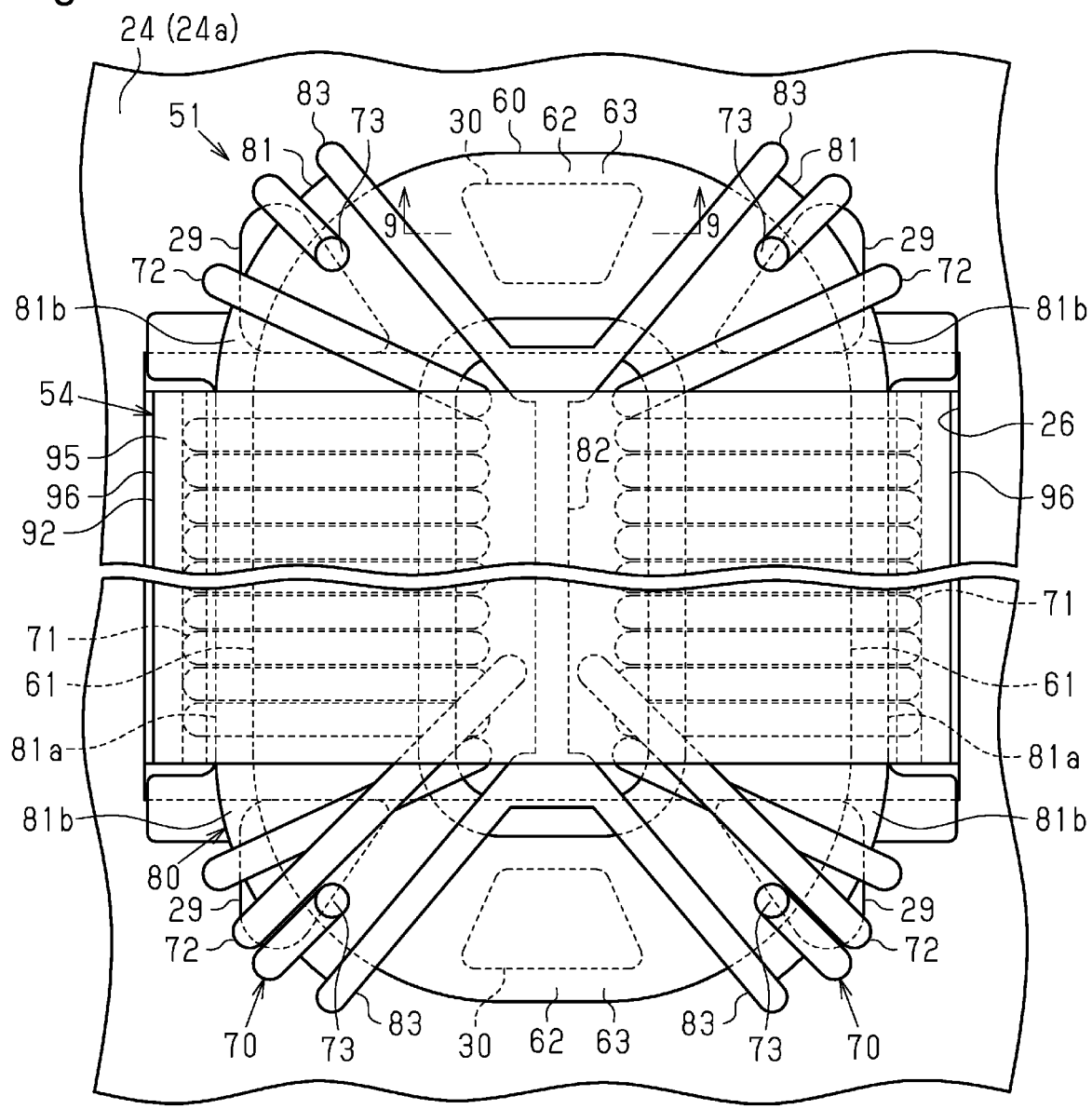
FIG. 8 is a plan view of the end wall of the suction housing member included in the motor-driven compressor in a modification.
Figure 9:
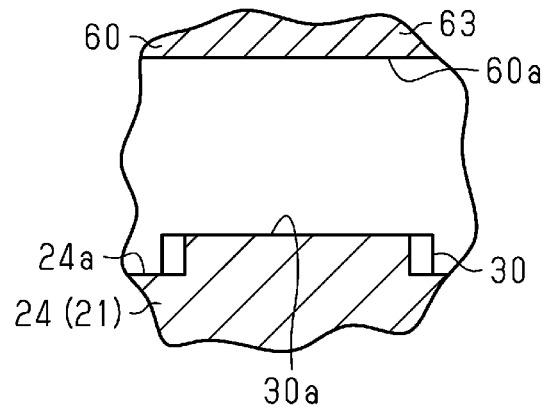
FIG. 9 is a cross-sectional view taken along line 9-9 in FIG. 8, illustrating the end wall of the suction housing member included in the motor-driven compressor in the modification.

As shown in FIGS. 8 and 9, the suction housing member 21 may include third projections 30 as additional projections that project from the outer surface 24a of the end wall 24 toward the winding-free portions 63 of the core 60. The third projections 30 are, for example, trapezoidal. Each third projection 30 includes a distal end surface 30a that is a flat surface.

This structure reduces the distance from the winding-free portions 63 of the core 60 to the suction housing member 21 and improves the heat dissipation performance of the core 60. The distal end surfaces 30a of the third projections 30 are flat surfaces. Thus, for example, compared to when the distal end surfaces 30a of the third projections 30 are inclined surfaces or uneven surfaces, the distance from the winding-free portions 63 to the distal end surfaces 30a of the third projections 30 easily becomes even in the planar direction of the distal end surfaces 30a of the third projections 30. This suppresses fluctuation of the heat dissipation performance of the winding-free portions 63.

The third projections 30 do not need to be trapezoidal. The distal end surfaces 30a of the third projections 30 do not need to be flat surfaces. The distal end surfaces 30a of the third projections 30 may be, for example, inclined surfaces or uneven surfaces.

The holder 42 may be omitted.

The thickness T1 of the first metal plate 91 may be greater than or equal to the thickness T2 of the second metal plate 92.

The material of the first metal plate 91 may have thermal conductivity that is higher than or equal to the material of the second metal plate 92.

The conductor 54 may be formed by a single member that is continuous without segmentation. In this case, the conductor 54 does not include a joining portion. Further, the conductor 54 is made of one type of material. The thickness of the conductor 54 may be the same or different in the circumferential direction.

The conductor 54 may be shaped into a loop by joining three or more members with one another. In this case, the materials of the three or more members forming the conductor 54 may be the same or different. Further, the thicknesses of the three or more members forming the conductor 54 may be the same or different.

The first metal plate 91 does not need to include the two first extending portions 94. In this case, the opposite ends of the first body portion 93 in the longitudinal direction and the two second extending portions 96 are joined with one another.

Each winding 70 does not need to be wound around the arcuate portions 62 of the core 60. In other words, each winding 70 does not need to include the second coil portions 72. In this case, the suction housing member 21 does not need to include the second projections 29. Further, each core insulating portion 81 does not need to include the second covering portions 81b.

The core 60 does not need to be stadium-shaped and looped as long as the core 60 is looped. In the present disclosure, being looped includes, for example, circular, elliptical, and any polygonal shape with acute or rounded corners.

The two core insulating portions 81 may be separate from the winding insulating portion 82.

The core insulating portion 81 does not need to include the bulging portion 84.

The thermal interface material does not need to be the thermal paste 56.

In the above embodiment, the space to which the thermal paste 56 is applied may instead be a void. In this case, the first projection 27 is directly opposed to the first coil portions 71 of the two windings 70 without the thermal paste 56. The first projection 27 being opposed to the two windings 70 may be the first projection 27 opposed to the two windings 70 through the thermal interface material as in the embodiment or the first projection 27 opposed to the two windings 70 without the thermal interface material as in the modification. Likewise, each second projections 29 is directly opposed to the corresponding second coil portion 72 of each winding 70 without the thermal paste 56.

The compression unit 13 does not need to be of a scroll type. The compression unit 13 may be, for example, of a piston type or a vane type.

The motor-driven compressor 10 does not need to be applied to the vehicle air conditioner 100. The motor-driven compressor 10 may be installed in a fuel cell electric vehicle. In this case, the motor-driven compressor 10 may compress air, which is fluid supplied to a fuel cell, with the compression unit 13.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
a compression unit configured to compress fluid;
a motor configured to drive the compression unit;
an inverter device configured to drive the motor; and
a housing that accommodates the inverter device, wherein
the inverter device includes
an inverter circuit configured to convert direct-current power into alternating-current power, and
a noise reduction unit arranged at an input side of the inverter circuit and configured to reduce common mode noise and normal mode noise included in the direct-current power input to the inverter circuit,
the noise reduction unit includes
a common mode choke coil including a looped core and two windings wound around the core, and
a looped conductor surrounding the two windings,
the conductor is configured so that an induced current flows in the conductor in a circumferential direction of the conductor to resist changes in a leakage magnetic flux from the core,
the conductor includes a housing-side conductor portion located between the two windings and the housing,
the housing-side conductor portion includes a through-hole that extends through the housing-side conductor portion, and
the housing includes a projection that is inserted into the through-hole and opposed to the two windings.

2. The motor-driven compressor according to claim 1, wherein the projection includes a distal end surface that is a flat surface.

3. The motor-driven compressor according to claim 1, wherein
one of the two windings is a first winding and an other one of the two windings is a second winding,
the common mode choke coil includes a winding insulating portion that is arranged between the first winding and the second winding to insulate the first winding from the second winding,
the projection is divided into a first projecting portion that is opposed to the first winding and a second projecting portion that is opposed to the second winding, and
the winding insulating portion is located between the first projecting portion and the second projecting portion.

4. The motor-driven compressor according to claim 1, wherein
the core includes two straight portions extending in parallel with each other and two arcuate portions each connecting corresponding ends of the two straight portions to each other and located at outer sides of the conductor,
each of the two windings includes a first coil portion located at an inner side of the conductor and wound around one of the two straight portions and two second coil portions wound respectively around the two arcuate portions,
the projection includes a first projection, and
the housing further includes a second projection projecting toward at least one of the second coil portions.

5. The motor-driven compressor according to claim 1, wherein
the common mode choke coil includes a core insulating portion that is arranged between the core and the windings to insulate the core from the windings, and
the core insulating portion includes a bulging portion that bulges toward the housing from a portion of the core insulating portion located at an opposite side of the windings from the housing-side conductor portion.

6. The motor-driven compressor according to of claim 1, wherein
the core includes a winding-free portion that is free from the windings, and
the housing further includes an additional projection projecting toward the winding-free portion.

* * * * *